United States Patent

Moore et al.

[11] Patent Number: 6,038,813
[45] Date of Patent: Mar. 21, 2000

[54] METHOD AND APPARATUS FOR CONTROLLING ROOT GROWTH

[75] Inventors: Richard L. Moore, Fairhope, Ala.;
Michael G. Robson, Kissimmee, Fla.;
Warren E. Lockeby, Jr., Orlando, Fla.;
Billy E. Kaylor, Leesburg, Fla.

[73] Assignee: The Lerio Corporation, Mobile, Ala.

[21] Appl. No.: 08/803,084

[22] Filed: Feb. 20, 1997

[51] Int. Cl.[7] .................................................. A01G 23/04
[52] U.S. Cl. .......................... 47/75; 47/73; 47/82; 47/901
[58] Field of Search .................... 47/73, 75, 901, 47/79, 82

[56] References Cited

U.S. PATENT DOCUMENTS

| | | | |
|---|---|---|---|
| D. 313,203 | 12/1990 | Carlson | D11/153 |
| 2,909,002 | 10/1959 | Hendry | 47/1 |
| 3,293,798 | 12/1966 | Johnson, Sr. | 47/34.12 |
| 3,511,501 | 5/1970 | Sandberg | 273/34 |
| 3,624,692 | 11/1971 | Lux | 47/1.2 |
| 4,027,429 | 6/1977 | Georgi | 47/73 |
| 4,106,235 | 8/1978 | Smith | 47/59 |
| 4,142,324 | 3/1979 | Magyar, Jr. | 47/75 |
| 4,148,155 | 4/1979 | Allen | 47/59 |
| 4,177,604 | 12/1979 | Friesen | 47/62 |
| 4,183,176 | 1/1980 | Barfield | 47/79 |
| 4,213,271 | 7/1980 | Petruzzi et al. | 47/39 |
| 4,232,482 | 11/1980 | Watt et al. | 47/71 |
| 4,347,687 | 9/1982 | Sibgel | 47/79 |
| 4,887,388 | 12/1989 | Waltel, Jr. | 47/79 |
| 4,996,792 | 3/1991 | Holtkamp, Sr. | 47/81 |
| 5,007,135 | 4/1991 | Rigsby | 47/73 |
| 5,020,275 | 6/1991 | Bednarzik | 47/79 |
| 5,099,609 | 3/1992 | Yamauchi | 47/81 |
| 5,103,584 | 4/1992 | Whisenant | 47/79 |
| 5,103,587 | 4/1992 | Holler | 47/75 |
| 5,222,326 | 6/1993 | Higgins | 47/73 |
| 5,279,070 | 1/1994 | Shreckhise et al. | 47/39 |
| 5,315,783 | 5/1994 | Peng | 47/66 |
| 5,638,638 | 6/1997 | Moskowitz | 47/71 |

FOREIGN PATENT DOCUMENTS

| | | |
|---|---|---|
| 681968 | 2/1965 | Italy . |
| 427391 | 6/1967 | Switzerland . |

*Primary Examiner*—J. Woodrow Eldred
*Attorney, Agent, or Firm*—Roylance, Abrams, Berdo & Goodman, L.L.P.

[57] ABSTRACT

A first outer container is formed with a side wall and a bottom wall. The bottom of the first container has a support structure or raised area to define a water reservoir in the bottom of the container. An overflow drain is provided in the container and preferably in the raised area to limit the depth of the water reservoir. A second inner container including a drain hole and having a live plant is placed in the first container at or above the water level in the first container. The water in the first container has a depth to inhibit excessive root growth from the drain hole of the second container. Roots which grow through the drain of the second inner container contact the standing water in the reservoir and die and rot at the point where the roots contact the water to limit growth in the first container. The water in the first container is particularly effective in controlling root growth from the inner container through the drain holes in the first outer container.

38 Claims, 4 Drawing Sheets

METHOD AND APPARATUS FOR CONTROLLING ROOT GROWTH

FIELD OF THE INVENTION

The present invention relates generally to a method, a container and a container assembly for controlling excess root growth by a plant growing within the container. More particularly, the invention is directed to a method and a nested container assembly for limiting root growth outside the plant container.

BACKGROUND OF THE INVENTION

Plants are often grown in containers by the nursery industry so that the plants can be shipped directly to the market without the need for transplanting. Container grown plants produce numerous advantages to the nursery by reducing labor cost, as well as handling, packaging and other operating costs. In addition, growing plants in containers provides comparatively simplified weed control and enables controlled irrigation and fertilization. Because water only needs to be provided to the plant confined by the container, less water per acre is needed to promote rapid and efficient plant growth.

Growing plants in containers does, however, have several disadvantages. The soil mixture used for container grown plants usually has poor water retention so that watering must be regularly carried out to prevent the roots from becoming too dry. In addition, the containers are often placed above ground and in direct sunlight and wind which contribute to rapid water evaporation. The containers above ground are also subject to freezing temperatures which can damage the roots. Finally, winds will often blow the containers over thereby spilling the soil and damaging the plants.

To minimize these disadvantages associated with container grown plants, many nurseries anchor or bury the container in the ground. This reduces the risk of the roots freezing and the plant from blowing over in high winds. A significant disadvantage of buried containers is the difficulty of removing the container from the ground before the plants can be shipped. Moreover, the roots from the plant grow outward through the drain holes in the container into the surrounding soil. This increases the amount of effort required to remove the container from the ground and usually results in root damage to the plant. An example of this type of growing system is shown in U.S. Pat. No. 5,007,135. This growing system provides a sufficiently large opening in the container to encourage the roots to grow outwardly into the surrounding soil. The roots are then cut by a shovel or other tool to remove the container from the ground which inherently results in damage to the root system.

In recent years, many nurseries have used a below ground system where an empty container is buried in the ground and a growing container containing the plant is placed in the buried container. This system is often referred to in the industry as a pot-in-pot system. The system has several advantages over other growing systems. In particular, the pot-in-pot type system provides protection for the roots to resist freezing and from drying out in the sun. In addition, the buried container anchors the plant container and reduces the risk of the plants from blowing over in high winds.

As in other below ground growing systems, the roots from the growing container often grow outward from the drain holes into the below ground container. The below ground container is required to have drain holes to prevent excess water from remaining in the container which will otherwise cause the roots to rot and kill the plant. Often times the roots from the growing container will grow outward through the drain holes of the below ground container and into the surrounding soil. When this occurs, it is difficult to remove the growing container from the below ground container since the containers are now tangled with the root system. Often the growing container cannot be separated from the below ground container without removing both containers from the ground and cutting the roots. This disadvantage increases the labor costs and damages the root system of the plant.

Examples of various plant growing containers are disclosed in U.S. Pat. Nos. 4,106,235 to Smith, 5,279,070 to Shreckhise et al, 5,099,609 to Yamauchi and 1,665,124 to Wright and Italian Patent No. 681968 and French Patent No. 427,391. These patents disclose plant container systems having a plant container and a receptacle container for receiving the plant container and holding water for supplying water to the plant. U.S. Pat. Nos. 5,515,783 to Peng, 4,232,482 to Watt et al, 4,027,429 to Georgi and 1,533,342 to Schein disclose growing containers having a tray or other container below the plant container for collecting water. These containers do not provide a system for preventing the roots of the plant from becoming entangled with the other container.

Accordingly, there is a continuing need in the industry for improved plant growing system which overcomes the above disadvantages.

SUMMARY OF THE INVENTION

The present invention is directed to a method and a container and particularly a plant container for controlling root growth of a plant growing within the container. Accordingly, a primary object of this invention is to provide a method and plant container for supporting plant growth while controlling excessive root growth.

A further object of the invention is to provide a method and plant container for inhibiting root growth beyond the plant container without damaging the plant.

Another object of the invention is to provide an outer container having a water reservoir and a plant container positioned above the water reservoir whereby the water reservoir inhibits root growth from the plant container into the outer container.

Still another object of the invention is to provide a pot-in-pot growing assembly constructed to inhibit root growth from one pot to another.

A further object of the invention is to provide a pot-in-pot growing assembly which inhibits excessive root growth without the need for herbicides or growth inhibiting agents.

The objects and advantages of the invention are basically attained by providing a container comprising at least one side wall having a top end and a bottom end; a bottom coupled to the side wall and having a first portion coupled to the side wall and at least one second bottom portion spaced axially from the first portion toward the upper end of the side wall and an inner wall extending between the first and second portions, the inner wall and second portion having a dimension to support a second container within the at least one side wall at a height spaced from the first portion, wherein the inner wall of the container includes at least one drain opening positioned whereby the container is capable of retaining water at a level at or below the second bottom portion.

The objects of the invention are further attained by providing a container assembly comprising a first container including at least one side wall having a top end and a bottom end, and a bottom wall having a first bottom portion coupled to the bottom end of the side wall and at least one second bottom portion raised from the first bottom portion toward the top end, the second bottom portion having at least one water overflow drain opening for maintaining a water level in the first container at or below the second bottom portion; a second container nested in said first container, the second container including at least one side wall having a top and bottom end, and a bottom wall coupled to said at bottom end of the at least one side wall, wherein the bottom wall of the second container is spaced from the first bottom portion and positioned at or above said overflow drain, and above a water level contained in the first container, wherein water retained in the first container inhibits root growth by a plant in the first container from growing into said second container.

The objects of the invention are also attained by providing a method for controlling growth of a plant comprising the steps of providing a first container including at least one side wall having a top end and a bottom end, and a bottom wall coupled to the bottom end of the side wall, the first container having a water reservoir and an overflow drain to limit a depth of the reservoir, providing a first support member in said first container having a height at least equal to the depth of the reservoir, nesting and positioning a second container, for receiving a plant, in the first container, the second container having at least one side wall and a bottom, and at least one drain opening, positioning the second container above the water reservoir in the first container whereby water in the water reservoir inhibits plant root growth from the drain opening in the second container and inhibits root growth through the overflow drain of the first container.

Other objects, advantages and other salient features of the invention will become apparent from the following detailed description, which, taken in conjunction with the annexed drawings, discloses preferred embodiments of the invention.

BRIEF DESCRIPTION OF THE DRAWINGS

Referring to the drawings which form part of this disclosure.

DETAILED DESCRIPTION OF THE INVENTION

The present invention is directed to a container and container assembly and to a method of growing plants using the container assembly. More particularly, the invention is directed to a container assembly for growing plants and a method controlling excessive root growth.

The container assembly 10 of the present invention includes an outer container 12 having a support structure and an inner container 14. The inner container 14 is preferably dimensioned to fit within the outer container 12 in a nesting arrangement.

In the broadest form of the invention, the container assembly 10 includes the inner container 14 for containing soil and a live plant and the outer container 12 for receiving and supporting the inner container. The outer container 12 is constructed to hold a predetermined amount of water and to limit the depth of the water in the outer container 12. The outer container 12 further includes a suitable support structure to support the inner container 14 at or above the water level in the outer container 12. The support structure can be integrally formed with the outer container or a separate element placed in the container.

In preferred embodiments, the space between the bottom of the inner container 14 and the surface of the water is quite small, usually one inch or less. In embodiments of the invention, the outer container 12 maintains the water at a depth of about 2–5 inches. The depth is not particularly critical so long as the depth is sufficient to prevent the roots from growing through the water as discussed hereinafter in greater detail. In this manner, roots growing through drain holes in the inner container 14 contact the water before they are able to grow through drain holes in the outer container 12. The roots of most plants and particularly trees require air to grow and will not grow through the water when the water is of sufficient depth. Most roots which do grow into the water will die and rot where they contact the water. The remaining portions of the root system and the plant above the water are not affected and continue to grow. The outer container preferably has overflow drain holes to limit the depth of the water. The drain holes in the outer container 12 and the inner container 14 are preferably located such that the reservoir is formed therebetween to inhibit the growth of roots into the outer container 12. The respective drain holes in the inner and outer containers 14, 12 are located to define a tortuous path therebetween whereby the roots cannot grow between the containers without entering the water reservoir.

Figure 1:
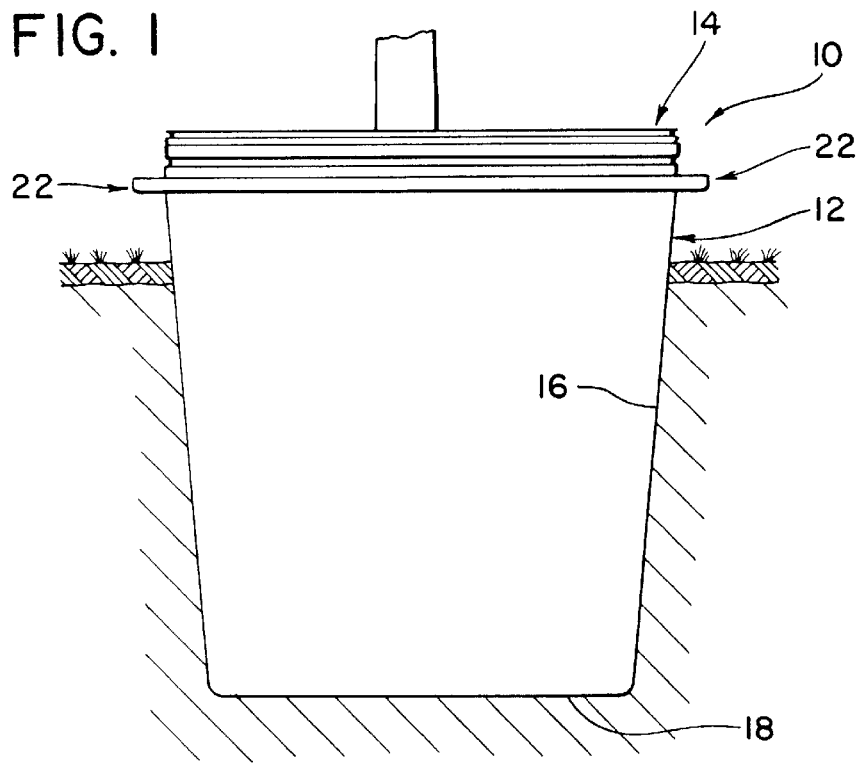
FIG. 1 is side elevational view of the container assembly in a first embodiment of the invention.

The container assembly 10 is similar to systems referred to in the industry as a pot-in-pot growing system. In this form of growing system, the outer container 12 is preferably anchored in place either by partially burying the outer container 12 in the ground as shown in FIG. 1 or by the use of hooks or ties. The outer container 12 is often referred to as the socket pot. The outer container 12 is preferably buried in the upright position with an upper end of the outer container 12 at ground level or slightly above ground level. Burying the outer container 12 in the ground is preferable in climates where the temperatures drop below freezing for extended periods of time to minimize root damage caused by freezing. The inner container 14 is dimensioned to fit easily in the outer container 12 without binding so that the containers can be easily separated.

The inner container 14 and outer container 12 are manufactured by conventional molding techniques as known in the industry. For example, the containers can be made by blow molding, injection molding, vacuum forming or rotational molding. In preferred embodiments, the containers are molded plastic containers of high density polyethylene although other suitable plastic materials can be used.

The outer container 12 is preferably of sufficient strength to withstand the pressures encountered when the container is placed in the ground to prevent twisting or collapsing. The container 12 includes at least one side wall 16 and a bottom 18. In the embodiment illustrated in FIGS. 1–4, the outer container 12 has a substantially frustoconical shaped wall 16 converging toward the bottom 18. In alternative embodiments, the outer container can have several straight side walls, a substantially cylindrical side wall or a frustoconical shaped side wall which converges toward an upper edge of the container.

In preferred embodiments, the upper edge 20 of the outer container 12 includes a strengthening lip 22 to resist deformation of the side wall 16. In the embodiment illustrated, the outer container 12 has a lip 22 having a corrugated cross section with a downturned edge 24, an outwardly extending flange 26 and an upturned edge 28. This type of structural lip can be made by any known plastic forming process.

Figure 2:
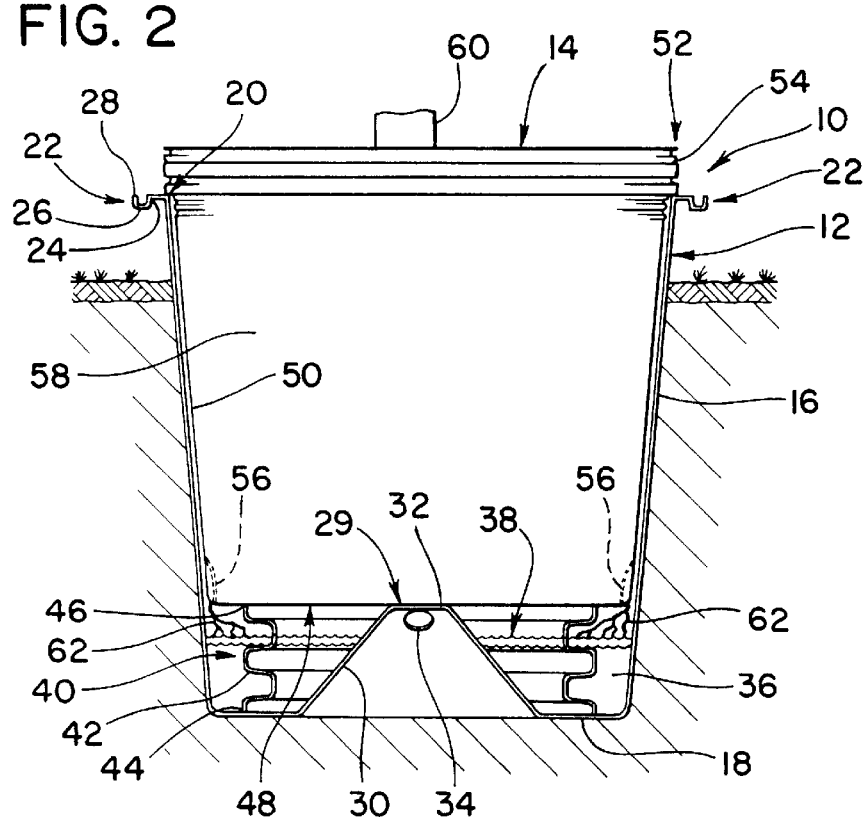
FIG. 2 is a side elevational side view of the container assembly of FIG. 1 showing the outer container and support member in cross section.
Figure 3:
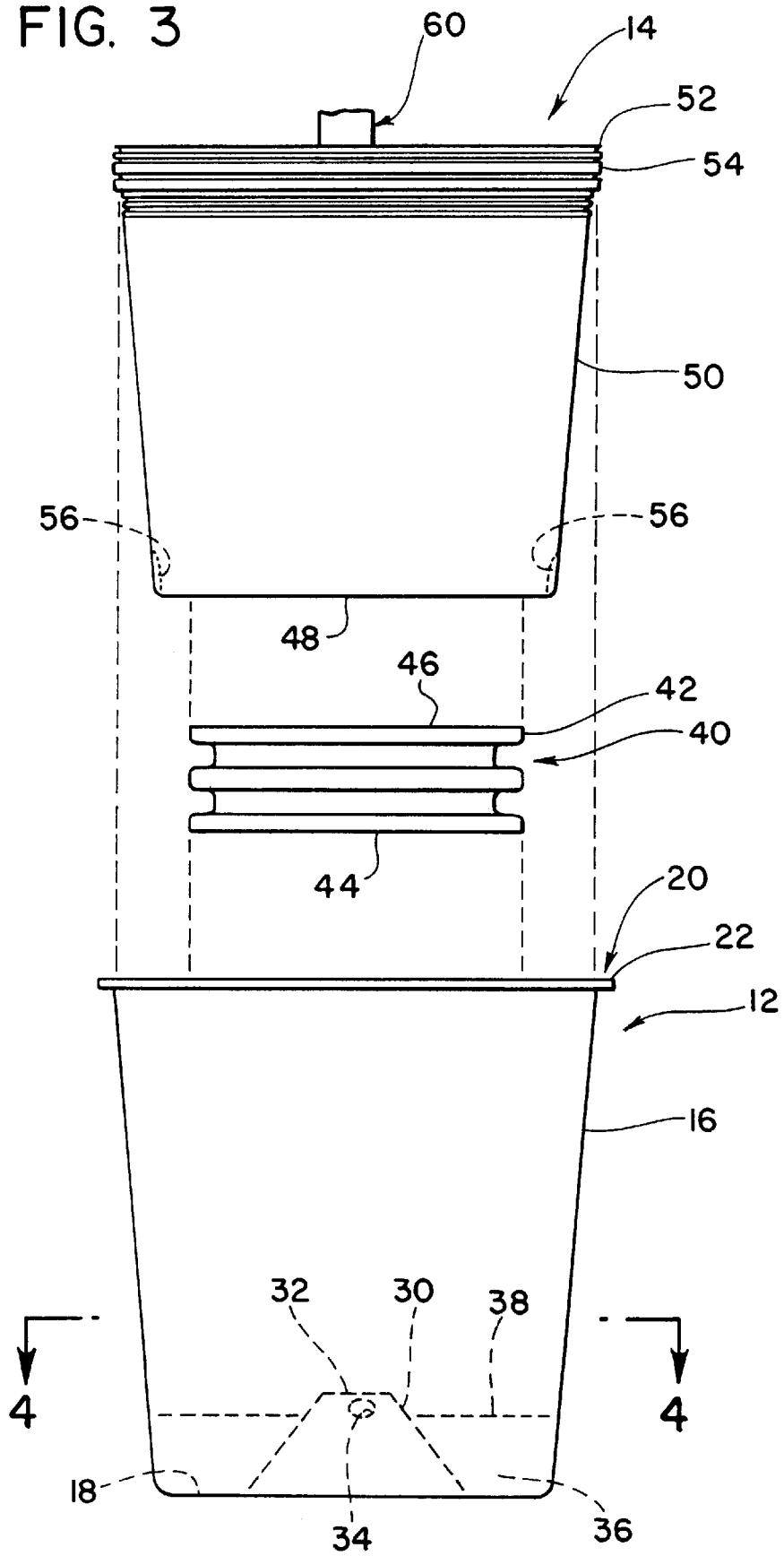
FIG. 3 is an exploded side elevational view of the container assembly of FIG. 1.
Figure 4:
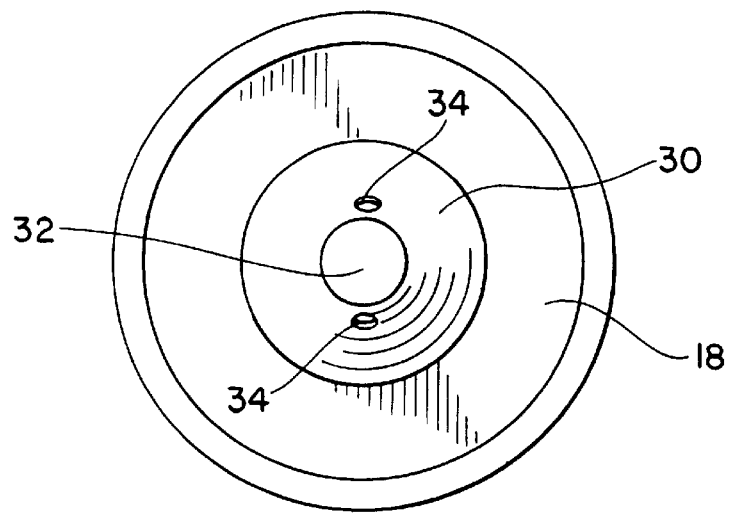
FIG. 4 is a top view of the outer container taken along line 4—4 of FIG. 3.

Referring to FIGS. 2 and 3, the bottom 18 of outer container 12 includes a raised structural portion 29 for supporting the inner container 14. In the embodiment illustrated, the bottom 18 of the outer container 12 includes a raised frustoconical wall section 30 extending from the bottom 18 toward the upper edge 20 of the container 12. The frustoconical wall section 30 terminates at a flat raised horizontal bottom portion 32 which is substantially parallel to the bottom 18. In further embodiments, the raised structural section 29 of the bottom 18 can be formed from a substantially vertical wall extending perpendicular from the bottom 18. The actual shape of the structural section 29 is a suitable shape capable of supporting the weight of the inner container 14.

In the embodiment illustrated in FIGS. 2 and 3, the outer container 12 includes at least one and preferably two apertures which function as overflow drain holes 34. Preferably the drain holes 34 are positioned toward the upper edge 20 of the frustoconical wall section 30 and adjacent the flat horizontal section 32. The bottom 18 of the container 12 is otherwise closed to form an area 36 for containing a quantity of water as discussed hereinafter in greater detail. The overflow drain holes 34 form an opening to drain excess water in the container 12 thereby maintaining a constant water level 38 in the container 12 and limit the depth of the water.

In an embodiment of the invention, a support structure 40 is positioned on the bottom 18 of the outer container 12 to assist in supporting the weight of the inner container 14 as discussed hereinafter in greater detail. In a preferred embodiment, the support structure 40 is a corrugated ring 42 which surrounds the frustoconical bottom wall section 30 and functions as a barrier between the drain holes in the inner container 14 and the overflow drain holes 34 in the outer container 12. The corrugated ring 42 has a bottom edge 44 engaging the bottom 18 and an upper edge 46 for supporting the bottom end of the inner container 14. Preferably the corrugated ring 42 has a height at least the height of the frustoconical wall section 30. In further embodiments, the corrugated ring 42 has a height slightly greater than the frustoconical wall section 30 to support the inner container 14 a slight distance above the frustoconical wall section 30.

Although the overflow drain holes 34 are preferably positioned toward the center of the container 12 in the frustoconical raised section 29, in alternative embodiments, drain holes can be formed in the side wall 16. The drain holes in the side wall 16 are spaced from the bottom 18 a distance to form a water reservoir in the bottom of the container 12. In further embodiments the outer container 12 has a substantially flat bottom without a raised portion or integrally formed support structure so that a separate, removable internal support structure, supports the weight of the inner container 14. In this arrangement, the drain holes in the side wall of the outer container 12 are positioned to maintain a suitable water depth.

The inner container 14 has a shape generally complimenting the shape of the outer container 12 to allow the inner container 14 to nest easily therein. In the embodiment illustrated, the inner container 14 has a bottom wall 48 and frustoconical side wall 50 converging toward the bottom wall 48. The side wall 50 terminates at an open upper end 52 and typically includes a strengthening rib or rim 54 as known in the art. The inner container 14 is formed with drain holes 56 which are usually formed in the lower end of the side wall 50 as shown. In alternative embodiments, the drain holes 56 in the inner container 14 can be formed in the bottom wall 48 toward the center of the container or toward the side wall 50. In preferred embodiments, the inner container 14 is a plastic container made using conventional plastic molding processes as discussed above.

In use, the inner container 14 is filled with soil or other growing material 58 for supporting growth of a plant 60. The outer container 12 is suitably anchored such as by placing in the ground 62 as illustrated. The corrugated ring 42 is placed in the bottom of the outer container 12 and the inner container 14 is nested within the outer container 12 such that the weight of the inner container is supported by the corrugated ring 42 and/or the frustoconical wall section 30. Excess water from the inner container 14 drains into the outer container 12 and is collected in the area for forming the water reservoir 36. Excess water drains through the overflow drain holes 34 in the outer container 12 to limit the depth of the water reservoir 36.

Over time, while the plant 60 grows, roots 62 grow outwardly through the drain holes 56 of the inner container 14. If allowed to continue growing, the roots 62 become entangled with the outer container 12 and eventually grow into the ground so that the inner container 14 cannot be removed or separated from the outer container 12. It has been found that the water retained in the bottom of the outer container 12 at a depth of about 2–5 inches prevents the roots from growing into and becoming entangled with the outer container 12. As the roots 62 grow into the water reservoir 36, the roots below the water level die and rot without adversely affecting the root system of the plant 60 in the inner container 14. By spacing the overflow drain hole 34 of the outer container toward the center of the outer container 12, the roots 60 must grow through a tortuous path before they reach the drain holes 34 in the outer container 12. The path the roots must take is designed to force the roots to grow through the water reservoir 36 a sufficient distance so that the roots are not able to grow and die before reaching the drain holes 34. The ring 42 also serves as a barrier for the roots growing between the inner container 14 and the overflow drain holes 34 of the outer container 12.

It is desirable to space the drain holes 56 in the inner container 14 and the drain holes 34 in the outer container 12 as far apart as possible to provide the longest possible path the roots must grow between the drain holes. When using an inner container 14 having drain holes 56 in the side wall 50 it is preferable to position the drain holes 34 toward the center of the outer container 12. In alternative embodiments, the drain holes 34 in the outer container 12 can be positioned in the side wall with the drain holes 56 in the inner container 14 staggered to create the longest path between the drain holes. In further embodiments, drain holes can be positioned in the side wall of the outer container and in the bottom of the inner container toward the center of the inner container. In this embodiment, a support member, such as the ring 42 is provided to support the inner container and form a physical barrier between the drain holes of the inner and outer container.

Figure 5:
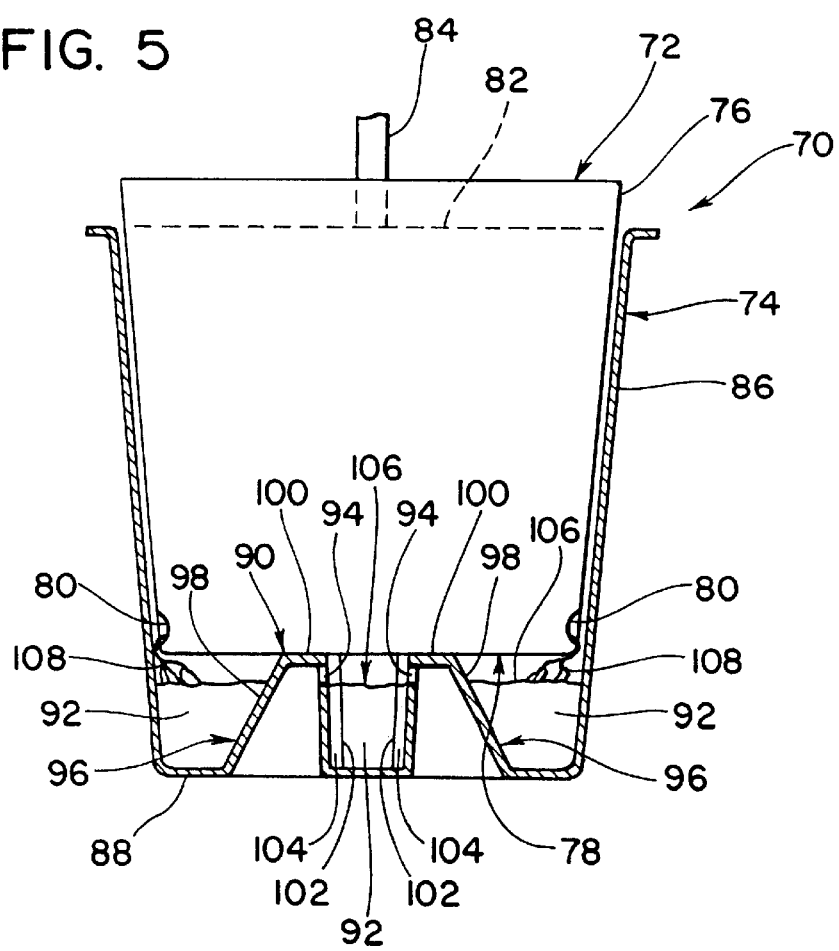
FIG. 5 is a side elevation view of the container assembly in a second embodiment showing the outer container in cross section.
Figure 6:
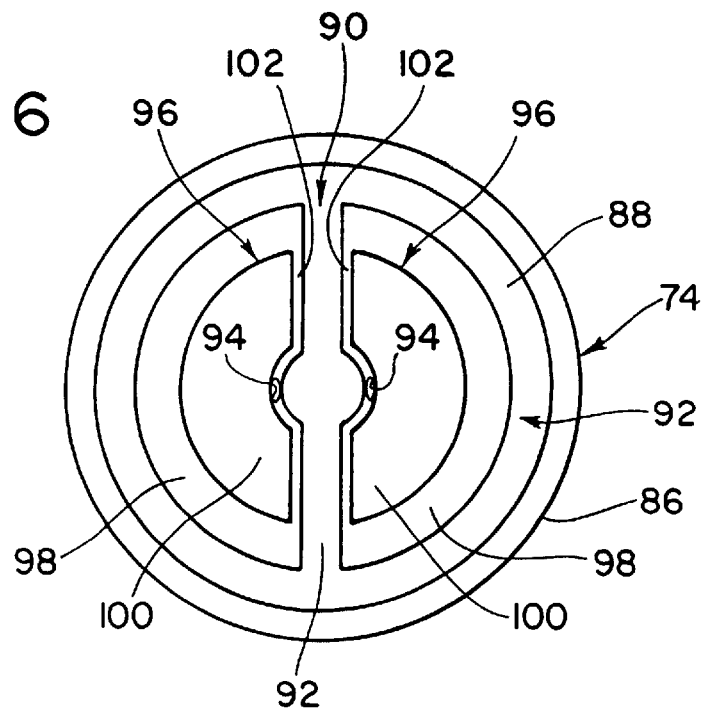
FIG. 6 is a top plan view of the outer container of the embodiment of FIG. 5.

In an alternative embodiment of the invention shown in FIGS. 5 and 6, the container assembly 70 includes an inner container 72 and an outer container 74. The inner container 72 has a side wall 76 and a bottom wall 78 with drain openings 80 in the side wall 76. The inner container 72 supports the soil 82 and a plant 84.

The outer container 74 includes a side wall 86 and a bottom wall 88. The bottom wall 88 includes a raised area 90 for supporting the inner container 72 and for forming a water reservoir 92 within the bottom of the container 74. Suitable drain holes 94 are positioned to control the depth of the reservoir 92. In the embodiment shown, the raised area 90 is formed from two symmetrical raised portions 96. Each raised portion 96 is formed to have a substantially frusto-conical outer wall 98 facing the side wall 86, a planar portion 100 substantially parallel to the bottom wall 88, and a straight inner wall 102. The inner wall 102 as shown is slightly inclined with respect to the bottom wall 88 although in further embodiments it can be substantially vertical. A semi-circular portion 104 is formed in the straight inner wall 102 as shown in the top view of FIG. 6. The drain holes 94 are preferably provided in the semi-circular portion 104 although they can be placed in any convenient location, including the outer wall. The raised portions can be any suitable shape and size capable of supporting the inner container.

As shown in the embodiment of FIGS. 5 and 6, the water level 106 in the outer container 74 is closely spaced to the bottom wall 78 of the inner container 72 and has a depth sufficient to inhibit extensive root growth from the inner container 72 into the outer container 74. In a preferred form of the invention the drain holes 94 in the outer container are positioned whereby the roots 108 from the inner container 72 must follow a tortuous path to reach the drain holes 94 in the outer container 74. The path which the roots 108 must follow through the water in the outer container 74 inhibits extensive root growth in the outer container 74 and prevents the roots 108 from growing through the drain holes 94 into the ground. The water 106 in the outer container 74 effectively controls the root growth so that the inner container 72 and the plant 84 can be separated from the outer container 74 without cutting the roots 108 or lifting the outer container 74 from the ground.

As in the embodiment of FIGS. 1–4, the drain holes in the inner and outer containers are positioned to create the greatest distance between the respective drain holes. In the embodiment illustrated, the drain holes 80 in the inner container 76 are positioned in the side wall while the drain holes 94 in the outer container 74 are positioned toward the center.

Figure 7:
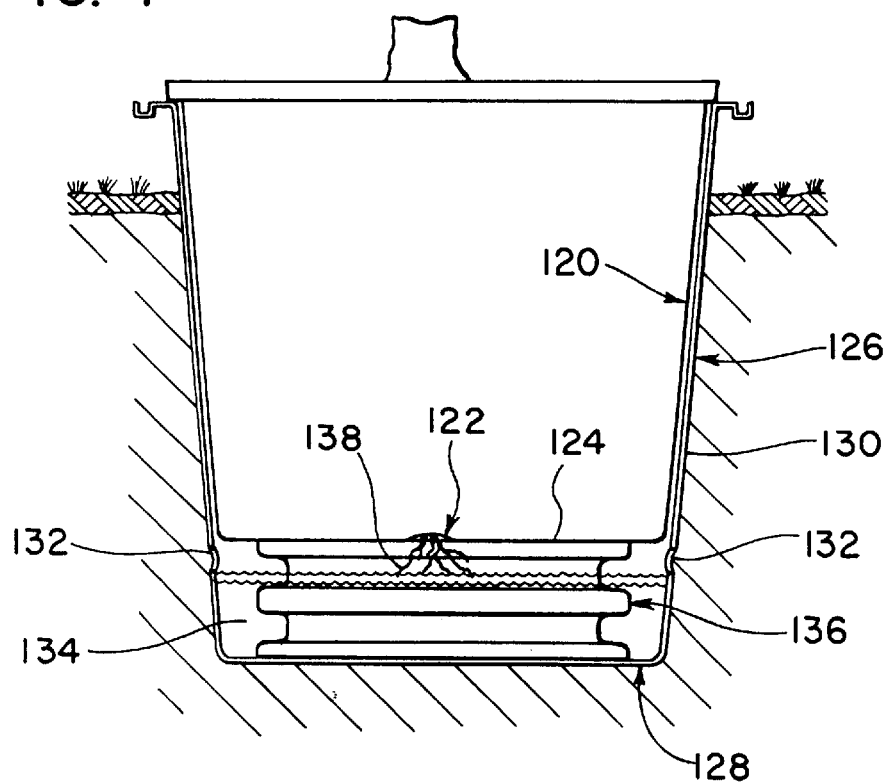
FIG. 7 is a cross sectional view of a container assembly in a further embodiment showing an inner container, a support member and an outer container.

In the embodiment of FIG. 7 an inner container 120 is similar to the embodiment of FIG. 5 except for having at least one drain opening 122 in a bottom wall 124. An outer container 126 includes a closed bottom wall 128 and a side wall 130 having one or more overflow drain openings 132 spaced from the bottom wall 128 to define a water reservoir 134. A support member 136 having the shape of a substantially annular shaped ring is positioned in the outer container 126 to support the inner container 120. In this embodiment, the drain opening 122 in the bottom wall 124 of the inner container 120 is surrounded by the support member 136 so that the support member 136 forms a barrier between the drain opening 122 and the overflow drain 132. The water retained in the reservoir 134 inhibits growth of roots 138 from the inner container 120 to the outer container 126. Alternatively, the drain holes can be in the side walls of the inner and outer container where the inner container is positioned to maximize the space between the respective drain holes.

While advantageous embodiments have been illustrated, it will be understood by those skilled in the art that various changes and modifications can be made therein without departing from the scope of the invention defined in the following claims.

What is claimed is:

1. A container assembly comprising:
    a first container including at least one side wall having a top end and a bottom end, a bottom wall coupled to said bottom end of said at least one side wall, said first container having at least one overflow drain opening spaced from said bottom wall to form a water reservoir and limit a depth of said reservoir in said first container;
    a second container for supporting a live plant having at least one side wall and a bottom wall coupled to said at least one side wall, said second container having at least one drain opening, said second container being dimensioned to be received in said first container; and
    at least one support member for supporting said second container at or above a water level of said water reservoir in said first container, wherein said at least one support member is at least one raised bottom portion extending from said bottom wall of said first container toward said top end, and wherein said overflow drain opening is disposed in said at least one raised bottom portion;
    wherein said water reservoir has a depth, and said overflow drain opening on said first container and said drain opening in said second container are spaced apart a sufficient distance to inhibit root growth from said second container through said overflow drain opening of said first container.

2. The assembly of claim 1, further comprising an annular ring substantially surrounding said at least one drain opening in said second container.

3. The assembly of claim 1, wherein said at least one raised bottom portion includes a substantially frustoconical wall coupled to said bottom wall of said first container.

4. The assembly of claim 3, further comprising
    a substantially annual ring surrounding said frustoconical wall and having a height at least equal to a height of said frustoconical wall.

5. A container comprising:
    at least one side wall having a top end and a bottom end;
    a bottom wall having a first bottom portion coupled to said at least one side wall, at least one second bottom portion spaced axially from said first bottom portion toward said upper end of said side wall, and an inner wall portion extending between said first and second bottom portions; and
    said inner wall portion and second bottom portion having a dimension to support a second container within said at least one side wall at a position spaced from said first bottom portion, wherein said inner wall portion of said bottom wall includes at least one overflow drain opening positioned at an upper end of said inner wall portion whereby said container is capable of retaining water at a level at or below said second bottom portion.

6. The container of claim 5, wherein said inner wall portion of said bottom wall is a frustoconical wall extending from said first bottom portion to said second bottom portion.

7. The container of claim 5, further comprising:

a support member on said first bottom portion and having a height substantially equal to said inner wall portion, said support member having a dimension to support the second container.

8. The container of claim 7, wherein said support member has a substantially annular shape and surrounds said second bottom portion.

9. The container of claim 5, further comprising:

a pair of said second bottom portions spaced apart from each other.

10. The container of claim 9, wherein each of said second bottom portions have a substantially arcuate outer edge facing said at least one side wall and an inner edge facing a center of said container.

11. The container of claim 10 wherein said inner edge of each said second bottom portions have a substantially arcuate face portion.

12. The container of claim 9, wherein each of said second bottom portions have a substantially frustoconical wall extending from said first bottom portion to each of said second bottom portion.

13. A container assembly comprising:

a first container including at least one side wall having a top end and a bottom end, a bottom wall having a first bottom portion coupled to said bottom end of said side wall, and at least one second bottom portion raised from said first bottom portion toward said top end, said first container having at least one overflow drain opening spaced from said first bottom portion for maintaining a water level in said first container at or below said second bottom portion; and a second container nested in said first container, said second container including at least one side wall having top and bottom ends, and a bottom wall coupled to said bottom end of said at least one side wall, said second container having at least one drain opening, at least one container support member on said first bottom portion and having a height at least equal to a height of said second bottom portion, wherein said bottom wall of said second container is spaced from said first bottom portion of said first container and positioned at or above said overflow drain in said first container and above water contained in said first container, wherein water is retained in said first container at a depth to inhibit root growth by a plant in said first container from growing into said second container.

14. The assembly of claim 13, wherein said second container includes at least one drain opening for draining excess water into said first container, and said overflow drain in said first container is located to define a tortuous path between said overflow drain and said drain opening in said second container to inhibit root growth from said second container through said overflow drain in said first container.

15. The assembly of claim 13, wherein said at least one support member has a substantially annular shape and surrounds said second bottom portion.

16. The assembly of claim 14, wherein said support member is at least one barrier member disposed between said overflow drain of said first container and said drain opening of said second container.

17. The assembly of claim 13, wherein said bottom wall of said first container comprises:

at least one inner wall having a lower end coupled to said first bottom portion and an upper end coupled to said second bottom portion, wherein said overflow drain in said first container is positioned in said at least one inner wall.

18. The assembly of drain 17, wherein said inner wall is a substantially frustoconical wall.

19. The assembly of claim 13, wherein said second bottom portion comprises:

first and second spaced-apart raised portions, each having an inner side wall facing each other and an outer side wall facing said at least one side wall of said container.

20. The assembly of claim 19, wherein said at least one overflow drain in said first container is positioned in at least one of said inner side walls.

21. The assembly of claim 19, wherein each of said inner side walls include an arcuate shaped face portion.

22. The assembly of claim 19, wherein said outer side wall of each of said raised portions have a substantially frustoconical shaped outer wall.

23. A method for controlling growth of a plant comprising the steps of:

providing a first container having at least one side wall with a top end and a bottom end, a bottom wall coupled to said bottom end of said at least one side wall, said first container having a water reservoir and an overflow drain to limit a depth of said water reservoir in said first container, providing a first support member in said first container having a height at least equal to said depth of said reservoir, wherein said first support member comprises an inner wall extending from said bottom wall of said first container toward said top end, positioning a second container, for receiving a plant, in said first container, said second container having at least one side wall and a bottom, and at least one drain opening, and positioning said second container above said water reservoir in said first container whereby water in said reservoir inhibits plant root growth from said drain opening in said second container through said overflow drain opening of said first container.

24. The method of claim 23, further comprising the step of providing a second support member in said first container for surrounding said first support member and supporting said second container.

25. The method of claim 23, wherein said at least one overflow drain opening is in said inner wall.

26. The method of claim 24, wherein said second support member has a substantially annual shape.

27. A method for controlling growth of a plant comprising the steps of:

providing a first container having at least one side wall with a top end and a bottom end, a bottom wall coupled to said bottom end of said at least one side wall, said first container having a water reservoir and an overflow drain to limit a depth of said water reservoir in said first container, providing a first support member in said first container having a height at least equal to said depth of said reservoir, positioning a second container, for receiving a plant, in said first container, said second container having at least one side wall and a bottom, and at least one drain opening, and positioning said second container above said water reservoir in said first container whereby water in said reservoir inhibits plant root growth from said drain opening in said second container through said overflow drain opening of said first container, wherein said drain opening in said second container is in said bottom wall, and said first support member is a substantially annular shaped ring surrounding said drain opening in said second container.

28. The method of claim 23, wherein said first support member comprises a pair of spaced apart and raised portions spaced from said bottom wall toward said top end.

29. The method of claim 28, wherein each of said raised portions comprise a first inner wall facing said side wall of said first container and coupled to said bottom wall;

a substantially planar bottom portion coupled to an upper end of said first inner wall; and a second inner wall coupled to said bottom wall and said planar bottom portion.

30. A container assembly comprising:

a first container including at least one side wall having a top end and a bottom end, a bottom wall coupled to said bottom end of said at least one side wall, said first container having at least one overflow drain opening in said side wall and spaced from said bottom wall to form a water reservoir and limit a depth of said reservoir in said first container;

a second container for supporting a live plant having at least one side wall and a bottom wall coupled to said at least one side wall, said second container having at least one drain opening in said bottom wall, said second container being dimensioned to be received in said first container; and at least one support member positioned on said bottom wall of said first container for supporting said second container at or above a water level of said water reservoir in said first container, said at least one support member being positioned to substantially encircle said at least one drain opening in said bottom wall of said second container; and wherein said water reservoir has a depth, and said overflow drain opening on said first container and said drain opening in said second container are spaced apart a sufficient distance to inhibit root growth from said second container through said overflow drain opening of said first container.

31. The assembly of claim 30, wherein said at least one support member is an annular ring.

32. The assembly of claim 30, wherein said at least one support member forms a barrier between said at least one drain opening of said second container and said overflow drain of said first container.

33. The container assembly of claim 1, wherein said support member comprises:

a pair of raised portions extending from said bottom end and defining a pair of raised bottom portions spaced apart from each other and spaced from said bottom end.

34. The container assembly of claim 33, wherein each of said bottom portions have a substantially arcuate outer edge facing said at least one side wall and an inner edge facing a center of said first container.

35. The container assembly of claim 34, wherein said inner edge of each said raised bottom portions have a substantially arcuate face portion.

36. The container assembly of claim 35, wherein said overflow drain is disposed in said arcuate face portion.

37. The container assembly of claim 1, wherein each of said bottom portions have a substantially frusto-conical wall extending from said bottom end to each of said raised bottom portions and facing said side wall of said first container.

38. The container assembly of claim 37, wherein said bottom portions include an inner wall extending from said bottom end to said raised bottom portions.

* * * * *